(12) United States Patent
Nunuparov et al.

(10) Patent No.: US 6,407,483 B1
(45) Date of Patent: Jun. 18, 2002

(54) METHOD OF POWER SUPPLY FOR ELECTRONIC SYSTEMS AND DEVICE THEREFOR

(75) Inventors: Martyn Sergeevich Nunuparov, Russian Federation, Moscow, Zelenograd, Korpus 1133-159 (RU); Nikolai Mikhailovich Maslennikov, moscow (RU)

(73) Assignee: Martyn Sergeevich Nunuparov (RU)

( * ) Notice: Subject to any disclaimer, the term of this patent is extended or adjusted under 35 U.S.C. 154(b) by 0 days.

(21) Appl. No.: 09/530,284
(22) PCT Filed: Oct. 29, 1998
(86) PCT No.: PCT/RU98/00352
§ 371 (c)(1),
(2), (4) Date: Apr. 27, 2000
(87) PCT Pub. No.: WO99/23749
PCT Pub. Date: May 14, 1999

(30) Foreign Application Priority Data

Oct. 30, 1997 (RU) .............................................. 97118033

(51) Int. Cl.⁷ .............................................. H01L 41/113
(52) U.S. Cl. ...................................... 310/339; 310/319
(58) Field of Search ........................... 310/316.03, 319, 310/339; 322/2 R

(56) References Cited

U.S. PATENT DOCUMENTS

| | | | | |
|---|---|---|---|---|
| 2,898,477 A | * | 8/1959 | Hoesterey ................... | 307/88.5 |
| 3,351,786 A | * | 11/1967 | Muller et al. ............... | 310/319 |
| 3,569,741 A | * | 3/1971 | Siegel ......................... | 310/319 |
| 3,585,415 A | * | 6/1971 | Muller et al. ............... | 310/319 |
| 3,624,451 A | * | 11/1971 | Gould .......................... | 317/80 |
| 3,801,893 A | * | 4/1974 | Joyce ......................... | 307/108 |
| 4,114,141 A | * | 9/1978 | Travis ......................... | 340/151 |
| 4,990,813 A | * | 2/1991 | Paramo ...................... | 310/309 |
| 5,264,752 A | * | 11/1993 | Savicki ................... | 310/316.03 |
| 5,396,141 A | * | 3/1995 | Jantz et al. .................. | 310/303 |
| 5,644,184 A | * | 7/1997 | Kucherov .................... | 310/306 |
| 6,198,205 B1 | * | 3/2001 | Oberlin et al. .............. | 310/339 |

FOREIGN PATENT DOCUMENTS

| | | | | |
|---|---|---|---|---|
| DE | 3303404 C1 | 4/1984 | .......... | H01C/41/08 |
| FR | 2500692 | 8/1982 | | |
| JP | 8-321642 A | * 12/1996 | ................. | 310/339 |

OTHER PUBLICATIONS

JP 09233862 A (Seiko Epson Corp.) Sep. 5, 1997 Abstract Class H02N Subclass 2/00.
WO 97/36364 A1 (Seiko Epson Corporation) Oct. 12, 1997 Abstract.

* cited by examiner

Primary Examiner—Thomas M. Dougherty
(74) Attorney, Agent, or Firm—Ostrolenk, Faber, Gerb & Soffen, LLP

(57) ABSTRACT

The invention relates to a method and apparatus that provide autonomous power supply by converting energy of sources of a non-electrical nature into the electric energy using charge generators. For such apparatuses, as charge generators can be used piezoelectric elements, triboelectric elements, as well as radioactive sources of charged particles that do not require periodic replacement of re-charging—in contradistinction to the convention sources of power supply, galvanic batteries. Charge generator (1), when activated, produces a portion of electric charges q having a high electric potential Uin, which portion is applied to the input of charge energy converter (2). The function of the converter (2) is to increase the initial value of charges q up to value of Q, with simultaneous reduction of their potential to Uout value, which less than Uin. For the purpose to store charges Q obtained as a result of the conversion, which charges Q are needed for the electronic systems power supply, electric charge storage (3) is positioned at the output of the apparatus.

32 Claims, 2 Drawing Sheets

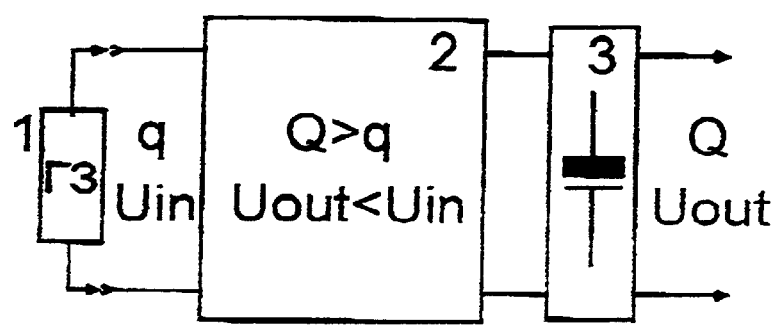
*Fig. 1*
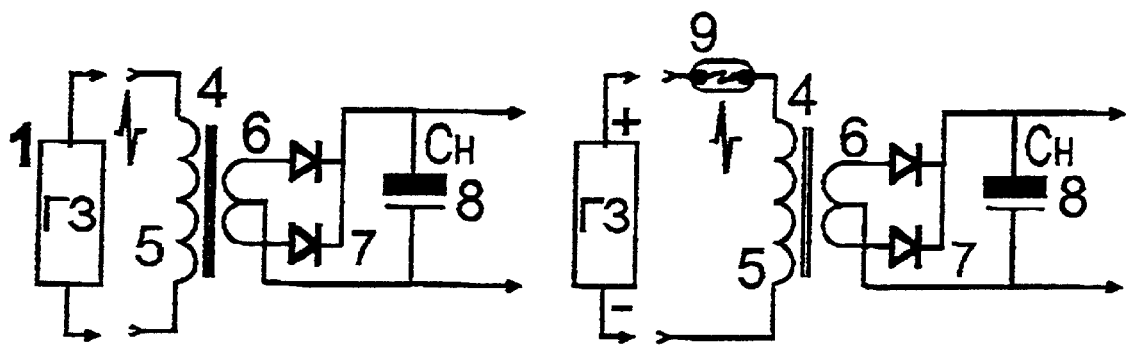
*Fig. 2a*        *Fig. 2b*

METHOD OF POWER SUPPLY FOR ELECTRONIC SYSTEMS AND DEVICE THEREFOR

FIELD OF INVENTION

The invention relates to means of autonomous power supply for electronic systems, and in particular to a method and apparatus to provide power supply for microelectronic charges.

PRIOR ART

Evolution of microelectronics has presently reached the point whereat for power supply of certain (e.g. CMOS) microelectronic circuits, that execute small volumes of computation, an extremely little amount of electric energy for their power supply is required. Therefore efforts are currently made to provide autonomous electric power supply for such microcircuits, using, for example, small-sized galvanic power sources integrated in their casing.

A drawback of such apparatus is a limited service life of a galvanic source.

In this connection, noteworthy are the attempts to abandon the short-life galvanic power supply sources and utilise small-sized apparatuses transforming energy of the sources of the non-electrical nature into the electric energy so that to obtain a small portion of electric charge that would be sufficient to provide power supply for an electronic system for a brief period.

Known, for example, are a method and apparatus to provide power supply for an electronic system through the use of an induction generator based on a stepping motor (U.S. Pat. No. 5,061,923, cl. H 01 Q 9/00, 1991). In said apparatus, for providing power supply for an electronic system used is a mechanical rotation of rotor of the mentioned motor, which rotation allows to induce at the stator winding output an electric voltage that is sufficient to provide power supply for an electronic system. For a number of apparatuses these mechanical movements is a cumber, and the other drawback are relatively large dimensions and a high cost of such motor that restrict utilisation of power supply sources of such type.

Known also are a method and apparatus for generating current pulses to activate a light-emitting diode (U.S. Pat. No. 4,595,864, cl. H 05 B 37/02, 1986). In said apparatus, an impacting mechanical action effected upon a piezoelectric element produces a current pulse, which pulse by a pulse transformer is converted into a current pulse needed to activate a light-emitting diode. In this apparatus, a pulse transformer, as the single element of the circuit, serves as a matching element necessary to provide the efficient passage of a current pulse from a piezoelectric element with a high output impedance to a light-emitting diode with a low input impedance. However, this known teaching is not intended for storing the electric energy produced by a piezoelectric element and needed to procure the steady power supply for electronic systems.

The method that is the most proximate to the invention is a method of power supply for an electronic system, which method consists in converting a non-electric energy into the electric one and storing the electric charges to provide power supply for an electronic system (application EP No. 0,725,452, cl. H 01 L 41/113, 1996). A power supply apparatus for an electronic system that realises said method comprises an electric charge generator using the piezoelectric conversion of the mechanical energy into the electric energy, and an electric charge storage, the output of which storage is the apparatus' output.

However, the known method and apparatus are of a little efficiency for providing power supply for electronic systems. The cause is that piezoelectric elements, in contradistinction to galvanic sources or induction generators are not sources of electromotive forces (potentials), but are generators of an electric charge. Besides, the value of a portion of an electric charge produced by a piezoelectric element is determined by one-time external mechanical action, and the electric potential emerging at output of such charge generator is directly proportional to a value of said charge and inversely proportional to the value of generator's output capacitance. In particular, piezoelectric elements allow to obtain the charges having small values with a very high electric potential of the order of several thousand volts. It is not possible to use such high-voltage source for providing the direct power supply for low-voltage electronic systems, such as, for example, microelectronic circuits. The immediate connection to a piezoelectric element of a buffer load electric capacitance for the purpose to store therein a charge needed for power supply for a low-voltage electronic system is not efficient, for the charge portion repeatedly produced by a piezoelectric element is very small, so that for storing a large charge required is a multiple and, accordingly, prolonged mechanical action to be effected upon a piezoelectric element, i.e. required are numerous mechanical depressions of impacts thereon (and in a mechanism according to application EP No. 0,725,452, cl. H 01 L 41/113, 1996 just these steps are implemented).

DISCLOSURE OF THE INVENTION

The object of the invention is to provide a method and apparatus to provide power supply for electronic systems, allowing to significantly improve efficiency of electric power supply sources implemented on the basis of apparatuses for converting the energy generated by sources of energy of the non-electric nature, into the electric energy.

To this end, in a method for providing power supply for an electronic system, which method consists in conversion of a non-electric energy into the electric one and in storing a required quantity of electric charges for the electronic systems power supply, in accordance with this invention the conversion of a non-electric energy into the electric one is carried out by generation of electric charges having a high electric potential, by conversion of the produced charges energy, which conversion is accompanied with an increase of quantity of electric charges and a reduction of their electric potential, with subsequent storing thereof at output of said power supply source, so that power supply for an electronic system will be provided.

Conversion of a non electric energy, in particular, mechanical energy into the energy of electric charges having a high electric potential can be done using a piezoelectric or triboelectric conversion.

Also of interest is the use of high-energy charged particles, which particles come into being as a result of a radioactive decay of a matter, as the charges having a high electric potential.

An apparatus that embodies such method of power supply for electronic systems, comprising a generator of electric charges which converts energy of the non-electric nature into the electric energy of charges having a high electric potential, and an electric charges storage, according to this invention further comprises a converter of energy of these charges, input of which converter is connected to output of a charge generator, and output of said converter is connected to input of the electric charge storage, output of which storage is the output of the apparatus. The charge energy converter is capable of increasing the quantity of the initial electric charges coming to its input from the charge generator, and of decreasing their electric potential.

The basic possibility to attain the above mentioned technical result can be explained basing on the energy conservation law for the conversion of the electric energy pursuant to this invention, which conversion, ideally, has the following form $q^* = U_{in} = Q^* U_{out}$, where q and $U_{in}$, respectively, are a charge and its potential at input of a charge energy converter, and Q and $U_{out}$, respectively, are a charge and its potential at output of said converter. Basing on this condition, it can be assumed that for the purpose to increase (multiply) the number of charges at output of the charge energy converter, i.e. so that Q>q condition will be satisfied, it is necessary that the potential at input of said converter $U_{in}$ will exceed the potential at its output $U_{out}$. The $U_{in} > U_{out}$ condition is easily realisable technically, for the potential of the charges produced by charge generators, such as piezoelectric elements or triboelectric elements, is inversely proportional to the own capacitance or load capacitance and is able to reach several thousand volts, while the potential needed to provide power supply for electronic systems, in particular microelectronic circuits, is only several volts. Efficiency of the charges quantity multiplying process will be determined by efficiency of said converter in respect of the process of transfer of electric energy of the initial charge from input of a converter to its output.

An electric charge storage in said apparatus can be implemented as an electric capacitor.

In one of the versions of embodiment of an apparatus for electronic systems power supply, a charge energy converter is implemented as a step-down transformer, the primary winding of which transformer is connected to output of an electric charge generator, and the secondary winding of which is connected through a rectifier to an electric charge storage. Such converter is efficient when a charge generator produces brief high-energy current pulses.

In another version of embodiment of an apparatus for electronic systems power supply, a charge energy converter is implemented as a semiconductor converter, the input region of which converter, connected to output of an electric charge generator, is defined by a semiconductor structure intended for storing the charges from the electric charge generator and for forming the avalanche break-down process when in the semiconductor structure the threshold voltage is exceeded; and the output region of the semiconductor converter is defined by the region of separation and storing of the secondary charges that are formed as a result of the avalanche break-down, and is connected via a rectifier to the electric charge storage. The semiconductor converter input region can be defined by various structures, for example, by inversely-shifted p-n transition, other types of diode structures, as well as by a transistor, or thyristor structure, that will provide a sharper avalanche process of electric charge multiplying.

A charge energy converter can also be implemented as a plurality of capacitors provided with a switch device for switching capacitors from the series connection needed to store charges from a charge generator to subsequent parallel connection allowing to reduce the charges potential at output of a converter and in this way to use the whole charge stored in each individual capacitor to a more complete extent. In this version, the electric charges' energy produced by a charge generator is used most efficiently.

An electric charge generator can be implemented as a piezoelectric element, triboelectric element. Also of interest is the use of such actually inexhaustible, in terms of capacity, generator of electric charges with a high electric potential as, for example, a radioactive source of charged particles, which source can be implemented as a capacitor, one of the plates of which capacitor comprises a radioactive matter emitting charged β-particles, the other plate being their collector.

Two latter types of an electric charge generator produce charges at a relatively slow rate, and for this reason it is advisable that a series of the above-discussed charge energy converters would be complemented with a short-pulse driver positioned between the electric charge generator output and input of an electric charge energy converter implemented similarly to a gas-discharge tube, or in the form of a semiconductor threshold element, for example, a thyristor.

BRIEF DESCRIPTION OF DRAWINGS

FIG. 1 block diagram of an apparatus for electronic systems power supply, wherein the claimed method of power supply for electronic systems is realised, comprising conversion and storing of electric charges.

FIG. 2a an apparatus for electronic systems power supply, wherein a charge energy converter is implemented on the basis of a step-down transformer.

FIG. 2b an apparatus of electronic systems power supply, wherein a charge energy converter is implemented on the basis of a step-down transformer, as complemented with a threshold element.

PREFERABLE EMBODIMENTS OF THE INVENTION

Figure 3:
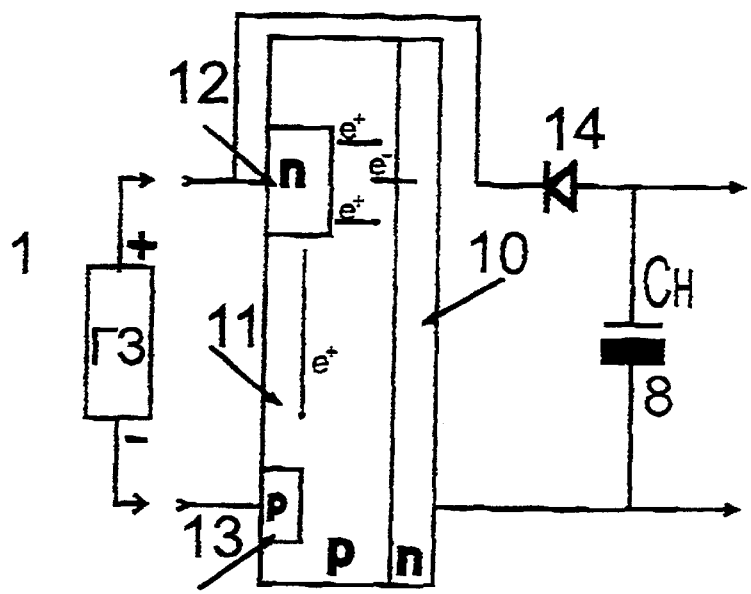
FIG. 3 a version of an apparatus for electronic systems power supply, wherein a charge energy converter is implemented on the basis of a semiconductor structure.

Referring to FIG. 1, an apparatus for electronic systems power supply comprises charge generator 1, output of which generator is connected to input of charge energy converter 2, and output of converter 2 is connected to input of charge storage 3, output of which storage is the output of the apparatus.

An electric charge storage can be implemented as an electric capacitor, as well as in the form of a more sophisticated system, comprising accumulating storages with galvanic or super-ionic elements.

According to FIG. 2a, an apparatus for electronic systems power supply, wherein a charge energy converter comprises transformer 4, the primary winding 5 of which transformer is the input of the converter, and its secondary winding 6, coupled to rectifier 7, forms the output of said converter, which output is coupled to storing capacitor 8 being the output element of said apparatus.

FIG. 2b shows an apparatus for electronic systems power supply, as implemented according to the arrangement shown in FIG. 2a, and complemented with threshold element 9.

In an apparatus for electronic systems power supply according to FIG. 3, a charge energy converter is implemented as a semiconductor structure having substrate 10 of n-type, with epitaxial layer of p-type. In epitaxial layer 11 formed are rectifying contact 12 implemented as p-n-transition, and ohmic contact 13. Contacts 12 and 13 form the input of said converter. Output storing capacitor 8 of said apparatus is coupled by one terminal to substrate 10, and by the other terminal via rectifier 14 to rectifying contact 12.

Figure 4:
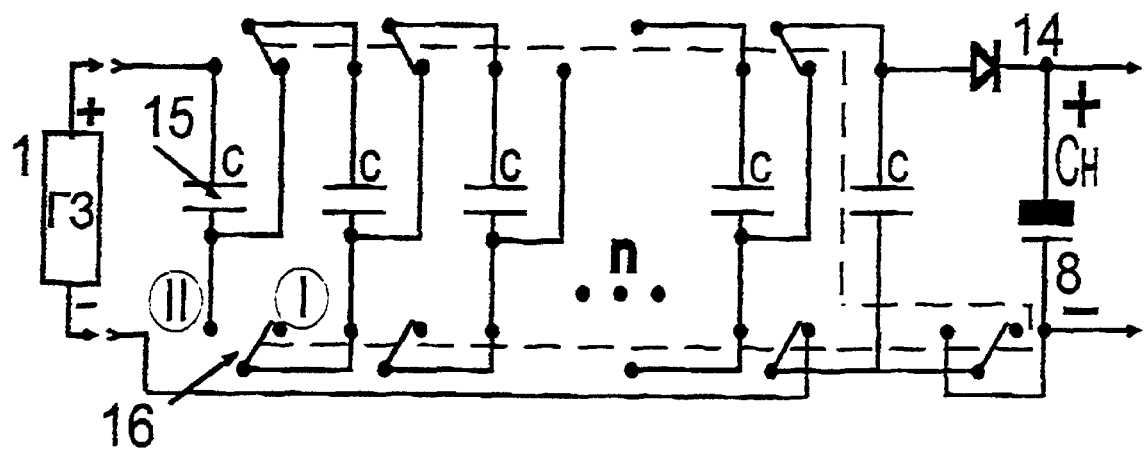
FIG. 4 an apparatus for electronic systems power supply, wherein a charge energy converter is implemented on the basis of a plurality of capacitors.

FIG. 4 shows an apparatus for electronic systems power supply, wherein a charge energy converter, comprising a plurality of n identical capacitors 15 can be, using switching means 16, transformed into an assembly with the series connection of these capacitors, when all switches are set in position I, or into an assembly with parallel connection of the capacitors, when all switches are set in position II. To the output of said converter, via rectifier 14, connected is output storing capacitor 8.

According to FIG. 1, conversion of a non-electric energy into the electric energy is performed by generator 1, which generator is implemented as being capable of producing electric charges q with a high electric potential Uin. The charges q produced by generator 1 are supplied to the input of charge energy converter 2, which converter is capable of increasing the initial quantity of electric charges and of reducing their electric potential at the output of converter 2. Electric charges Q from output of the converter are delivered to input of storage 3 of these charges; said storage plays the role of the output buffer of the apparatus for electronic systems power supply and is intended for storing and keeping electric charges, input of storage 3, as mentioned heretofore, is the output of the apparatus for electronic systems power supply.

Electric energy converters of an apparatus for electronic systems power supply according to FIGS. 2a and 2b are operated in the pulse mode. If activation of charge generator 1 results in creation of a high-energy current pulse, then when such current pulse is applied to the primary winding 5 of transformer 4, in this case owing to the electromagnetic transformation of the pulse energy in the secondary winding 6 of transformer 4 provided is a pulse of electromotive force. Whereas the number of turns in the secondary winding 6 is less than that in the primary winding 5, the electromotive force amplitude in the secondary winding 6 will be less than that of the input voltage, and the current amplitude in the secondary winding will exceed the current amplitude in the primary winding 5. Thus, full charge Q in this secondary pulse will be greater than charge q confined in the primary pulse originating from the charge generator. After the secondary current pulse is rectified in full-wave rectifier 7, its charge Q will be stored in storing capacitor 8.

If activation of charge generator 1 is unable to provide a brief high-energy current pulse, then it will be necessary to use threshold element 9 coupled in series to one of terminals of charge generator 1 and one of terminals of primary winding 5 of pulse transformer 4 (FIG. 2b). In this arrangement according to FIG. 2b, the current pulse in the transformer primary winding is created as a result of switching (break-down) of threshold element 9 when the voltage thereat exceeds a predetermined value.

A threshold element in this arrangement can be implemented as a tube with a gas-discharge gap, or as a semiconductor structure, a thyristor, for example.

The version according to FIG. 2b will be rather efficient when charge generator 1 is implemented as a triboelectric element, or a radioactive source of charged particles. In such generators, the electric charge and the corresponding potential at output of a generator are stored at a relatively slow rate.

In a charge energy converter of an apparatus for electronic systems power supply, implemented on the basis of a semiconductor structure according to FIG. 3, used is the effect of avalanche break-down in semiconductors. The use of the effects associated with autoelectronic ionisation by collision and avalanche breakdown in semiconductors promises numerous opportunities, which underlie these effects [S. M. Sze, Physics of Semiconductor Devices, N.Y., 1981]. In accordance with these effects, high-energy electrons owing to collisions against the environment molecules expel additional charge carriers therefrom which circumstance under certain conditions can result in a chain reaction of their avalanche like multiplying. On the basis of avalanche-like instabilities, such know semiconductor devices as thyristor and avalanche diodes are operated.

In an apparatus for electronic systems power supply implemented on the basis of a semiconductor converter according to FIG. 3, rectifying contact 12 comprises inversely-shifted p-n-transition, on the capacitance of which stored is charge q produced by charge generator 1. When the voltage in p-n transition exceeds the threshold voltage value, electric breakdown thereof occurs, which break-down is accompanied with emerging of an avalanche of electron-hole pairs. A portion of unbalanced charge carriers will flow to ohmic contact 13. However, if resistance of epitaxial layer 11 is made large enough, then the leakage current through contact 13 can be made smaller than the electron injection current from the heavily-doped n-region of substrate 10 in vicinity of contact 12, which current emerges owing to the spatial re-distribution of electric potentials in a structure after break-down of p-n transition of rectifying contact 12. The substrate injection current compensates for the unbalanced holes current that drift from contact 12 towards substrate 10, and this current will charge, via rectifier 14, storing capacitor 8 up to charge Q. For the reason that the quantity of the unbalanced charges brought about by the avalanche break-down many times exceeds charge q preliminarily produced by charge generator 1, such semiconductor converter will operate as a multiplier of charge q. As mentioned earlier, p-n transition region of contact 12 can be implemented as another semiconductor structure, for example, in the form of an avalanche semiconductor diode, transistor or thyristor. The main requirement to be fulfilled by this structure consists in that its input capacitance must be relatively small so that a charge having a high potential from a charge generator could be stored, and after the excess over a certain threshold voltage a current pulse of the break-down of this structure could be formed, the process of the charge carrier avalanche multiplying being created.

In an apparatus for electronic systems power supply shown in FIG. 4, a charge energy converter is based on switching of a plurality of elementary low-voltage capacitors 15 having capacitance C, and this converter realises a simple method of converting a value of the initial charge q produced by charge generator 1.

When capacitors 15 are connected in series (all switches 16 are set in position I), the total input capacitance of the converter is small and is determined as Cin=C/n, where C is capacitance of each of capacitors 15, and n is the number of capacitors 15 in the converter. When charge generator 1 produced a small portion of charge q, then the voltage at the input of the converter will be greater and determined as Uin=nq/C. Further, owing to the connection in series, each individual capacitor 15 will be charged by identical charge q. When afterwards all switches 16 are set in position II, all capacitors 15 will be connected in parallel. Such parallel connection of capacitors 15 will have capacitance of Cout= nC, and the charge of this capacitance will be equal to the sum of charges of all capacitors 15, i.e. equal to value Q=nq.

The value of the voltage created at the output of the converter can be determined as Uout=Q/Cout=q/C=Uin/n. Thus, the structure behaves as an n-times multiplier of charge q produced by charge generator 1, its potential at the output of the converter being simultaneously reduced n times. Storing of electric charges from a number of sequential acts of generation of electric charges by charge generator 1 takes place in storing capacitor 8 connected to the output of said converter, via rectifier 14.

Switches in FIG. 4 can be implemented both with mechanical control, and using the electronic means of switching.

Industrial Applicability

The invention allows an efficient use and storing of the electric energy from such sources as piezoelectric and triboelectric converters of mechanical energy, radioactive sources of charged particles, as well as from other generators of electric charges.

Application of power supply apparatuses corresponding to the invention is the most effective in autonomous electronic systems with a brief consumption of electric power supply, such as, for example, electronic locks, electronic card readers, calculators, portable remote control signal transmitters, sensors, etc.

Using the invention, radioactive charge generators can be efficiently used for long-term power supply for electronic systems that do not allow a frequent maintenance, such as, for example, artificial pacemakers, navigation radio beacons, signalling and alerting systems.

The invention allows creating systems for storing solar energy by efficient conversion of mechanical energy of such inexhaustible sources of mechanical energy as energy of wind, waves and tide streams.

The foregoing exemplary embodiments a method and apparatus of providing power supply for electronic systems are only illustrative and in no way limit the scope of the invention as characterised by the invention claims set forth herein.

What is claimed is:

1. An apparatus of power supply for electronic systems, comprising:
    an electric charge generator including a piezoelectric element operable to convert mechanical impact pulses into electric pulse energy;
    an electric charge storage, an output of which storage is the output of the apparatus; and
    a converter of electric pulse energy including a step-down transformer having a primary winding connected to an output of the electric charge generator and a secondary winding with a tap leg connected to an input of said storage and output leg connections of said secondary winding each connected through rectifying diodes to another input of said storage.

2. An apparatus as claimed in claim 1, characterised in that the electric charge storage is implemented in the form of capacitor.

3. An apparatus of power supply for electronic systems, comprising a generator of electric charges, which generator uses conversion of a non-electric energy into electric energy, and a storage of electric charges, an output of which storage is the output of the apparatus, characterised in that said apparatus further comprises an electric charge energy converter, the input of which converter is connected to an output of the electric charge generator, and the output of which converter is connected to the input of the electric charge storage, said converter being capable of increasing the number of the electric charges supplied to its input, and of reducing the potential of the electric charges at its output; and
    said apparatus further comprises a brief-pulse driver connected between the output of the electric charge generator and the input of the electric charge energy converter.

4. An apparatus according to claim 3, wherein the electric charge generator includes a piezoelectric element.

5. An apparatus according to claim 4, wherein the electric storage includes a capacitor.

6. An apparatus according to claim 3, wherein the electric charge generator includes triboelectric element.

7. An apparatus according to claim 6, wherein the electric storage includes a capacitor.

8. An apparatus according to claim 3, wherein the electric charge generator includes a radioactive source of charged particles.

9. An apparatus according to claim 8, wherein the electric storage includes a capacitor.

10. An apparatus according to claim 3, wherein the electric charge generator includes a capacitor.

11. An apparatus according to claim 10, wherein the electric storage includes a capacitor.

12. An apparatus according to claim 3, wherein the electric storage includes a capacitor.

13. An apparatus of power supply for electronic systems, comprising a generator of electric charges, which generator uses conversion of a non-electric energy into electric energy, and a storage of electric charges, an output of which storage is the output of the apparatus, characterised in that said apparatus further comprises an electric charge energy converter, the input of which converter is connected to an output of the electric charge generator, and the output of which converter is connected to the input of the electric charge storage, said converter being capable of increasing the number of the electric charges supplied to its input, and of reducing the potential of the electric charges at its output; and
    said charge energy converter includes a semiconductor converter, the input region of which semiconductor converter, connected to the electric charge generator output, is formed by a semiconductor structure intended for storing charges from the electric charge generator and for forming the avalanche break-down process when a threshold voltage on said semiconductor structure is exceeded, and the output region of the semiconductor converter being defined by a region of separation and storing of the secondary charges created as a result of the avalanche break-down, and coupled via a rectifier to the electric charge storage.

14. An apparatus according to claim 13, wherein the electric charge generator includes a piezoelectric element.

15. An apparatus according to claim 14, wherein the electric storage includes a capacitor.

16. An apparatus according to claim 13, wherein the electric charge generator includes a triboelectric element.

17. An apparatus according to claim 16, wherein the electric storage includes a capacitor.

18. An apparatus according to claim 13, wherein the electric charge generator includes a radioactive source of charged particles.

19. An apparatus according to claim 18, wherein the electric storage includes a capacitor.

20. An apparatus according to claim 13, wherein the electric charge generator includes a capacitor.

21. An apparatus according to claim 20, wherein the electric storage includes a capacitor.

22. An apparatus according to claim 13, wherein the electric storage includes a capacitor.

23. An apparatus or power supply for electronic systems, comprising a generator of electric charges, which generator uses conversion of a non-electric energy into the electric energy, and a storage of electric charges, an output of which storage is the output of the apparatus, characterised in that said apparatus further comprises an electric charge energy converter, the input of which converter is connected to an output of the electric charge generator, and the output of which converter is connected to the input of the electric charge storage, said converter being capable of increasing the number of the electric charges supplied to its input, and of reducing the potential of the electric charges at its output; and said charge energy converter includes a plurality of capacitors provided with a switching device intended for switching the capacitors from an in-series connection, for storing the charges from the electric charge generator, to subsequent parallel connection permitting addition of the charges stored at each of the capacitors, with a simultaneous reduction of the potential of these charges at the converter output.

24. An apparatus according to claim 23, wherein the electric charge generator includes a piezoelectric element.

25. An apparatus according to claim 24, wherein the electric storage includes a capacitor.

26. An apparatus according to claim 23, wherein the electric charge generator includes a triboelectric element.

27. An apparatus according to claim 26, wherein the electric storage includes a capacitor.

28. An apparatus according to claim 23, wherein the electric charge generator includes a radioactive source of charged particles.

29. An apparatus according to claim 28, wherein the electric storage includes a capacitor.

30. An apparatus according to claim 23, wherein the electric charge generator includes a capacitor.

31. An apparatus according to claim 30, wherein the electric storage includes a capacitor.

32. An apparatus according to claim 23, wherein the electric storage includes a capacitor.

* * * * *